(12) United States Patent
Harris (10) Patent No.: US 9,619,822 B1
(45) Date of Patent: Apr. 11, 2017

(54) METHOD AND SYSTEM FOR IDENTIFYING USER PROPENSITY TO ACCESS CONTENT VIA A COMMUNICATION NETWORK

(75) Inventor: Christopher Kenneth Harris, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 608 days.

(21) Appl. No.: 13/417,098

(22) Filed: Mar. 9, 2012

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0251* (2013.01)

(58) Field of Classification Search
None
See application file for complete search history.

(56) References Cited

U.S. PATENT DOCUMENTS

| | | | |
|---|---|---|---|
| 7,698,315 B2 | 4/2010 | Colace et al. | |
| 2008/0294577 A1* | 11/2008 | Agarwal | G06Q 10/00 706/12 |
| 2011/0099059 A1 | 4/2011 | Agarwal et al. | |
| 2011/0213655 A1* | 9/2011 | Henkin et al. | G06Q 30/00 705/14.49 |
| 2011/0258035 A1 | 10/2011 | Oren et al. | |
| 2012/0059713 A1 | 3/2012 | Galas et al. | |
| 2012/0303464 A1* | 11/2012 | Gorman et al. | G06Q 30/02 705/14.71 |
| 2013/0124970 A1* | 5/2013 | Zeine et al. | G06F 17/3089 715/234 |

* cited by examiner

*Primary Examiner* — Namrata (Pinky) Boveja
*Assistant Examiner* — Richard Reinhardt
(74) *Attorney, Agent, or Firm* — Foley & Lardner LLP; John D. Lanza; James De Vellis (57) ABSTRACT

Systems and methods of identifying user propensity to access a web page via a communication network are provided. A data processing system can receive a request for subject matter to provide for display with the web page. A referring URL identifying a source web page can be identified from the request. Based on the source web page, a score can be assigned to the request. A quality metric can indicate a likelihood that a user associated with the request will access content provided for display with the web page, and this quality metric can be adjusted based on the score.

15 Claims, 3 Drawing Sheets

METHOD AND SYSTEM FOR IDENTIFYING USER PROPENSITY TO ACCESS CONTENT VIA A COMMUNICATION NETWORK

BACKGROUND

In a networked environment such as the Internet, entities such as people or companies can provide information to devices connected to the network. The information can include content such as advertisements. A user can click on an advertisement displayed on a web page to access additional content via the Internet.

SUMMARY OF THE INVENTION

At least one aspect is directed to a computer implemented method of identifying user propensity to access content via a communication network. The method receives, at a data processing system, a request for content to provide for display with a web page. The method identifies, from the request, a referring uniform resource locator (URL). The referring URL can identify a source web page. The method assigns a score to the request based on the source web page, and can adjust a quality metric associated with the request based on the score. The quality metric can indicate a likelihood of a user associated with the request to access the content provided for display with the web page.

At least one aspect is directed to a system of identifying user propensity to access content via a communication network. The system includes a data processing circuit that can receive a request for content to provide for display with a web page. The data processing system can identify, from the request, a referring URL. The referring URL can identify a source web page. The data processing system can also assign a score to the request based on the source web page and can determine a quality metric associated with the request based on the score. The quality metric can indicate a likelihood of a user associated with the request to access the content provided for display.

At least one aspect is directed to a non-transitory computer readable medium having instructions to identify user propensity to access content via a communication network. The instructions can include instructions to receive a request for content to provide for display with a web page. The instructions can also include instructions to identify, from the request, a referring URL. The referring URL can identify a source web page. The instructions can also include instructions to assign a score to the request based on the source web page and to adjust a quality metric associated with the request based on the score. The quality metric can indicate a likelihood of a user associated with the request to access the content provided for display.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for identifying content to provide via a communication network for display with a web page. The various concepts introduced above and discussed in greater detail below may be implemented in any of numerous ways, as the described concepts are not limited to any particular manner of implementation. Examples of specific implementations and applications are provided primarily for illustrative purposes.

One implementation is directed toward a data processing system configured to estimate a click through rate or other quality metric associated with content provided via a computer network, such as an Internet advertisement. The click through rate can be determined based at least in part on the referring URL that indicates a source website or web page that a user device is using to click on an advertisement. A data processing system can evaluate the referring URL information received with a request for an advertisement to be displayed with a web page to identify a source web page. Based on this evaluation, the data processing system can determine that the user is has an increased or decreased likelihood to click on an advertisement or other content displayed on a web page.

For example, a user browsing the Internet can view a first (source) web page, and then browse to a second (new) web page. When a user device initiates a request for the new web page, the web browser can communicate with the data processing system to request content for display with the web page. The data processing system can identify the referring URL from the header information in the request, which may include a Hypertext Transfer Protocol (HTTP) request. The data processing system can evaluate the referring URL to identify the source web page that the user is coming from to visit the second, new web page. The data processing system can also identify a category of the source web page. For example, the data processing system can identify the source web page as being a search engine web page, or a web page of a social network or other entertainment website.

The data processing system can identify a correlation between the source web page and user activity on the second web page. For example, the data processing system can determine that a user requesting access to a new web page from a search engine (e.g., a landing page or a search results page) has a higher click through rate than a user arriving from another (e.g. content or social network) web page. The click through rate can be a predicted or estimated click through rate. The data processing system can assign a score or weight based on the particular source web page (or the category of the source web page) from which a user requesting access to a new web page originated. The data processing system can determine or adjust the click through rate that indicates the probability that the user will click on an advertisement to access content during the rendering of the new web page at the user device.

For example, a user originating from a search engine web page can be assigned a relatively high score because the data processing system can determine that users interacting with a search engine web page are more likely to click on advertisements or other content during a browsing session. The score can be used to increase an estimated click through rate for the rendering or impression of the new web page. Based on the estimated click through rate, the data processing system can determine or adjust (e.g., increase) a bid value of an auction price to provide content for display with the new web page to the user who is arriving from, for example, the search engine web page.

In another example, the data processing system can determine that the user is arriving at (being referred to) a new web page from a source web page such as a web page of a social networking website. In this example, a user device viewing a web page of a social network website can click on content such as an ad to access another web page that can be outside the social network website. The data processing system can determine that users who arrive at a web page from a social networking website are relatively less likely to click on advertisements on the new web page than those arriving at the new web page via a search engine web page such as a search engine results or landing web page. Based on this determination, the data processing system can lower the estimated click through rate of this impression of the web page to the user, and price the bid value of the auction price accordingly.

The privacy and anonymity of the user can be respected throughout this process. For example, the activity of users on the network can be maintained in an anonymous fashion so that individuals cannot be identified from the user activity. Furthermore, the user activity information can be collected on an opt-in basis, and users can opt out of the collection of their user activity information. The user can be represented by identifiers associated with a computing device, for example using a cookie without regard to the actual identity of the individual person using the computing device.

Figure 1:
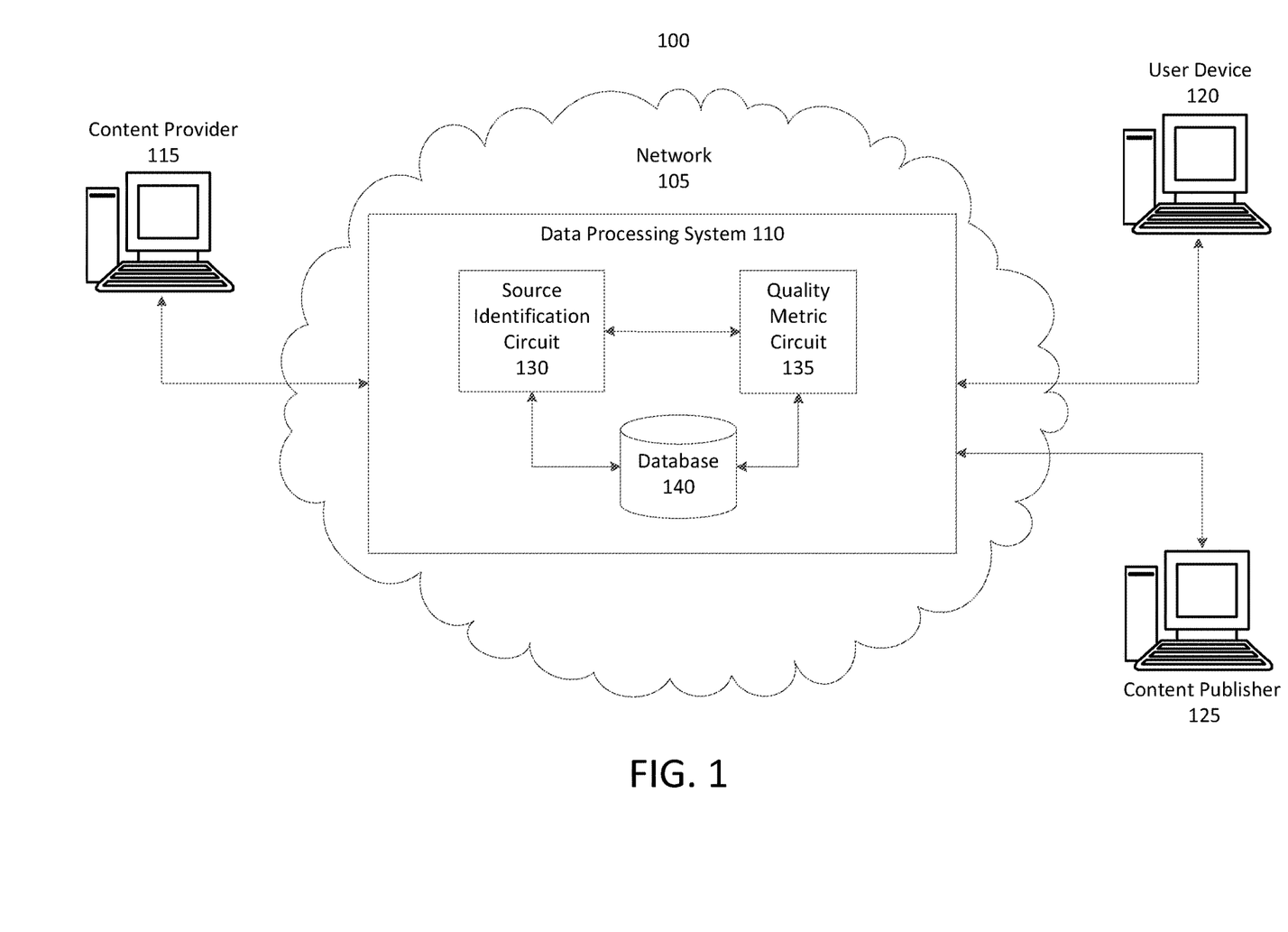
FIG. 1 is a block diagram of an example environment to identify user propensity to access a web page via a communication network, according to an illustrative implementation.

FIG. 1 illustrates an example system 100 for identifying user propensity to access a web page via a communication network 105 according to an implementation of the present disclosure. The network 105 can include computing networks such as the Internet, local, metro, or wide area networks, intranets, and other communication networks such as mobile telephone networks. The system 100 can also include data processing system 110. The data processing system 110 can include at least one processor or logic device to communicate with at least one content provider 115, at least one user device 120, and at least one content publisher 125. For example, the data processing system 110 can receive advertisements or other information such as keywords used to place the advertisements that the content provider 115 provides via the network 105. The data processing system 110 may receive requests from the user device 120 to display content from at least one content publisher 125. In addition to this content, the data processing system 110 can also provide content for display to the user device 120, such as an advertisement from content provider 115. The advertisement can be displayed concurrently with the content from content publisher 125 at the user device 120 on a web page.

In one implementation, the data processing system 110 includes at least one source identification circuit 130, at least one quality metric circuit 135, and at least one database 140. The source identification circuit 130 and the quality metric circuit 135 can include at least one processor or logic device to, for example, identify a source web page from which a request to access a second web page originates, or to identify a quality metric (e.g. click through rate) corresponding to the request. The source identification circuit 130 and the quality metric circuit 135 can be separate components or an integrated part of the data processing system 110. The source identification circuit 130 and the quality metric circuit 135 can communicate with the database 140 (e.g. a data structure) to store and retrieve information via the network 105, such as quality metric information or information about a request to access a web page, such as information identifying a source web page displayed at the user device 120.

In one implementation, the data processing system 110 receives information from the user device 120, for example via a web browser operating at the user device 120 that provides information to the data processing system 110 using the network 105. The user device 120 may be a server, a desktop computer, a laptop computer, a tablet computing device, a smartphone, or a television or set top box, for example. The information received by the data processing system 110 from the user device 120 can include a request for content to display with a web page from the content publisher 125. For example, the user device 120 can execute a web browser application, and a web browser of the user device 120 may request access to a web page of the content publisher 125. The request can be received by the data processing system 110. The user device 120 can request content for display with a web page by entering a URL directly into a web browser or by clicking on a hyperlink corresponding to content from content publisher 125. The request for content can contain information about the current website that is displayed on the user device 120 when the request is made. The information about the current website can be indicated by the referring URL. In some implementations, the request is an HTTP request initiated by a web browser, and the referring URL can be included with the header information associated with the HTTP request.

For example, the user of the user device 120 may be browsing the Internet. The user device 120 can access a search engine web page to find other web pages based on search terms. The request to access a web page can be initiated by the user device 120 when the user clicks on a link in a list of search results. In this example, the request for new content received and evaluated by the data processing system 110 can contain information indicating that the referring URL is a search engine web page. The request for access to a new web page can indicate that the referring URL is a specific search engine or belongs to a generic category of search engines. The data processing system 110 can receive the request indicating that the user device 120 requests access to a web page of the content publisher 125. In this example, the source identification circuit 130 can receive and evaluate the referring URL received with the request. From this evaluation, the source identification circuit 130 can identify a source web page displayed at the user device 120. For example, the source identification circuit 130 can determine the category of the source web page (e.g. a search engine) or a particular operator of the source web page.

In another example, the user device 120 may display an entertainment website such as a social network website during a browsing session. The user device 120 can initiate a request for a new web page in response to the user clicking on a link displayed on the current web page (i.e. the source web page). In this example, the request for new content can include information identifying the referring URL as belonging to the category of social networking websites or could indicate the particular social networking website that is currently displayed on the user device 120. The data processing system 110 can receive the request from the user device 120.

In some implementations, the user device 120 can request access to content from the content publisher 125. Content publisher 125 can include a web page operator that develops or makes available content (e.g. a website or web pages of a website) for display on the user device 120. The request from the user device 120 to the content publisher 125 can identify the referring URL. The content publisher 125 can forward this request to the data processing system 110 in order to retrieve an advertisement or other content for display with the web page at the user device 120.

The content provider 115 can be a computing device operated by an advertising entity to provide information to the data processing system 110. For example, the content provider 115 may provide information including advertisements to the data processing system 110 for display on the user device 120 via the network 105. In some instances, the content provider 115 can subscribe to a pay service to display content such as advertisements on user device 120 via the network 105.

In one implementation, the source identification circuit 130 identifies the referring URL from the information received with a request to access a web page or other content. For example, the user device 120 can be a smartphone executing a web browser to search for information about a topic. The user of the smartphone can enter search terms into a search engine displayed in the web browser, and then click on a link in the search results. This can initiate a request to display the linked web page, and the request can be received by the source identification circuit 130. The source identification circuit 130 can examine the request and identify the particular web page or determine the website category of the referring URL. The information included in the request can be stored in the database 140, and the source identification circuit 130 can access information stored in the database 140 to process the request.

In some implementations, the quality metric circuit 135 determines or adjusts a quality metric corresponding to the request to access a new web page based on the referring URL identified by source identification circuit 130. For example, the quality metric can be a numeric score such as a click through rate or conversion rate that indicates a likelihood that the user of the user device 120 will access content from the content provider 115 when it is displayed alongside content from the content publisher 125. A higher quality metric score can represent an increased likelihood that the operator will access the content. The click through rate generally indicates a probability that the user of the user device will click on a link to access additional content. The conversion rate generally indicates a probability that the user will access the additional content and take further action, such as purchase a product or service corresponding to the additional content.

In one example, the quality metric circuit 135 determines the quality metric based on the referring URL. In this example, the data processing system can determine a correlation between the referring URL and user activity on a new webpage, as users originating from a certain web page or categories of web pages can be more likely to access content on a new website.

For example, users of search engine websites can be more task-oriented than users of other websites, and may be actively seeking content related to their search terms. These users may be more likely to access advertisements that are related to the content for which they are searching. Thus, in some examples, the quality metric circuit 135 can assign a higher score (or increase an existing score) to a user who is arriving at a new web page from a search engine web page. The quality metric circuit 135 can communicate with the source identification circuit 130 to determine from the referring URL that the source web page is, for example, a search engine landing page. In another example, the quality metric circuit 135 can assign a higher score to a first search engine website than a second search engine website, based on a determination that users of the first search engine are more likely than users of the second search engine to access advertisements from content provider 115 after arriving at a new website published by content publisher 125. In one implementation, the source identification circuit 130 identifies more than one web page previously accessed by the user device 120. For example, during at least one browser session, the user device 120 can access a search engine web page, and then access at least one intermediate web page prior to a time in which the data processing system 110 receives a request for content to display with a web page. Based, for example on browsing activity of the user device 120, the data processing system 110 can determine that the user device 120 originated from a search engine (or other) source web page a determined number of web pages back in a browsing history of a session, or can determine an amount of time that has passed since the source web page was accessed, and can use this information to assign a score to the request. The score may account for intermediate web pages and time delays. For example, a relatively high score reflecting a search engine source page can be adjusted downward to account for intermediate web page visits or time periods that may indicate that the user is less actively searching for information on the network 105.

In one implementation, the quality metric circuit 135 can assign a lower score (or reduce an existing score) to the quality metric when the source identification circuit 130 determines that a source web page at the user device 120 is a social networking web page. Relative to users of search engine web pages, users of social networking web pages may be less task-oriented and therefore less likely to access advertising content on a new web pages. For example, a user browsing a social networking website can initiate a request for a new website by clicking on a link provided by the social networking website. In this example, the quality metric circuit 135 can assign a lower score to the user relative to a score of a user device 120 displaying a source web page of a search engine, based on a determination that the referring URL identifies a social networking website, or other website that a user consults on a regular basis. For example, quality metric circuit 135 can assign a lower score if the referring URL indicates a news, sports, blog, or other website that a user often consults. In this example, the data processing system 110 can determine a pattern of use that indicates repeated or regular visits to a web page or web site by the user device 120.

The quality metric circuit 135 can communicate with any of the source identification circuit 130, the database 140, the user device 120, or the content publisher 125 to identify the referring URL of a request. The score assigned by the quality metric circuit 135 can be determined at least in part from the source web page identified by the referring URL. In other examples, a preexisting score can be adjusted (e.g. increased or decreased) by the quality metric circuit 135 and used to determine the quality metric (e.g. click through or conversion rate).

In one implementation, the data processing system 110 receives a request via the network 105 to provide subject matter for display with a web page at the user device 120. The request can identify the referring URL (e.g. the source web page from which the request originates). Based, for example, on an identification of the source web page by the source identification circuit 130, the quality metric circuit 135 can assign a score to the request for subject matter. The score generally indicates a likelihood of the user to access content, for example by clicking on links. The quality metric circuit 135 can use the score to adjust a quality metric, such as a click through rate that estimates the probability that the user device will access content (e.g. an advertisement) provided for display with the web page being accessed. The data processing system 110 can set or adjust a bid value that indicates a price for the content provider 115 (e.g. advertiser) to pay to have their advertisement or other content provided for display with the web page.

Figure 2:
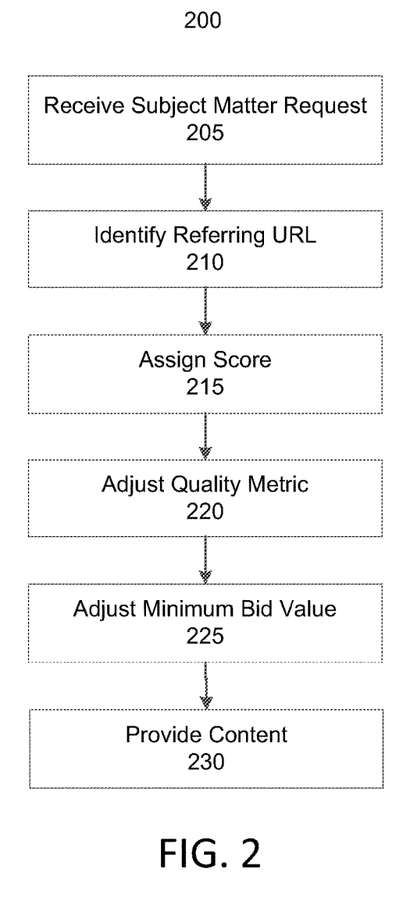
FIG. 2 is a flow chart of a method identifying content to provide via a communication network for display with a web page, according to an illustrative implementation.

FIG. 2 illustrates a flow diagram depicting a method 200 of identifying user propensity to access a web page via a communication network. The method 200 can receive a request for subject matter to provide for display with a web page (BLOCK 205). For example, a data processing system can receive the request (BLOCK 205) for subject matter. The received request can include a request from a user device to display a web page at a user device. The data processing system can receive the request (BLOCK 205) from the user device or from a content publisher who has received a request from the user device, for example. The request can be received using protocols such as HTTP. The received request (BLOCK 205) can include information identifying the user device in a manner that preserves the anonymity of the user of the user device. For example, anonymity can be preserved by excluding personal identification information of the user such as the user's name, search terms entered by the user, or historical usage data for the user device.

The method 300 can also identify the referring URL (BLOCK 210) from the received (BLOCK 205) subject matter. The referring URL can identify the source web page of the request. In some implementations, a category of the referring URL can also be identified (e.g. search engine, social network, etc.). For example, if a user clicks on a link from a search engine web page, the method 200 can evaluate the referring URL to identify the source web page or a category (i.e. a search engine) of the source web page. In some implementations, the request can include a HTTP request, and the method 200 can determine the referring URL (BLOCK 210) by examining the header information contained in the request.

The method 200 can assign a score to the request (BLOCK 215) based on the referring URL. In some implementations, the score is a numeric value associated with the request that indicates a probability that a user device will access content on a new web page after arriving from the source web page indicated by the referring URL. The score may be a number from one to ten, or a binary system where zero indicates a low probability and one indicates a high probability. For example, the method 200 can determine that users requesting access to a new web page from a referring URL corresponding to a search engine source web page are relatively more likely to access content on the new web page and may assign a score of "one" in a binary system or seven on a scale of one to ten, with ten indicating the highest probability. The method 200 can also determine that a user is relatively less likely to access content on a new web page if the user is referred from the URL of a social networking source web page. In this example, the method 200 can assign a higher score to the request from the user whose referring URL is a search engine web page, and a lower score to the request made by the user whose referring URL is a social network web page.

The method 200 can also adjust a quality metric associated with the request based on the score (BLOCK 220). For example, the quality metric circuit can adjust a click through rate to account for the source web page from which the request originated. The quality metric can be an estimate of the likelihood that user will access content displayed on a new web page. For example, the quality metric can be an estimated click through rate or an estimated conversion rate for an advertisement. In some implementations, the quality metric can be adjusted upward when the score is relatively high and can be adjusted downward when the score is relatively low. For example, the quality metric can be increased for a request by a user who is referred to a new web page from a search engine, and decreased for a user who is referred to a new web page from a social networking site. A preexisting quality metric can be adjusted (BLOCK 220) or a new quality metric can be generated based at least in part on the assigned score (BLOCK 215). In some implementations, the method 200 can determine the quality metric from the score. In other implementations, the score can be predetermined based on other factors such as the content of the web page or information about the user device, and the method 200 can subsequently adjust the quality metric based on the score.

In one implementation, the method 200 adjusts a minimum bid value of an auction (BLOCK 225) to provide the content to be displayed with the new web page based on the adjusted quality metric. For example, the content to display with the new web page can be an advertisement, and advertisers can submit bids in an auction for the right to display advertisements with the new web page. In some implementations, the minimum bid value of an auction can be increased in response to a relatively high adjusted quality metric, or decreased in response to a relatively low adjusted quality metric.

The method 200 can also provide content for display with a web page (BLOCK 230). The content can be displayed on the user device in a new browser window or in the same browser window as the new web page. In some implementations, the method 200 can deliver content that is related to the new web page so that the user is likely to be interested in the content. The content delivered by the method 200 can include advertisements such as advertisements configured for display in an advertisement slot of a web page, popup advertisements, or banner advertisements. The content provided responsive to the received subject matter request can include content of a web page as well as additional content such as advertisements.

Figure 3:
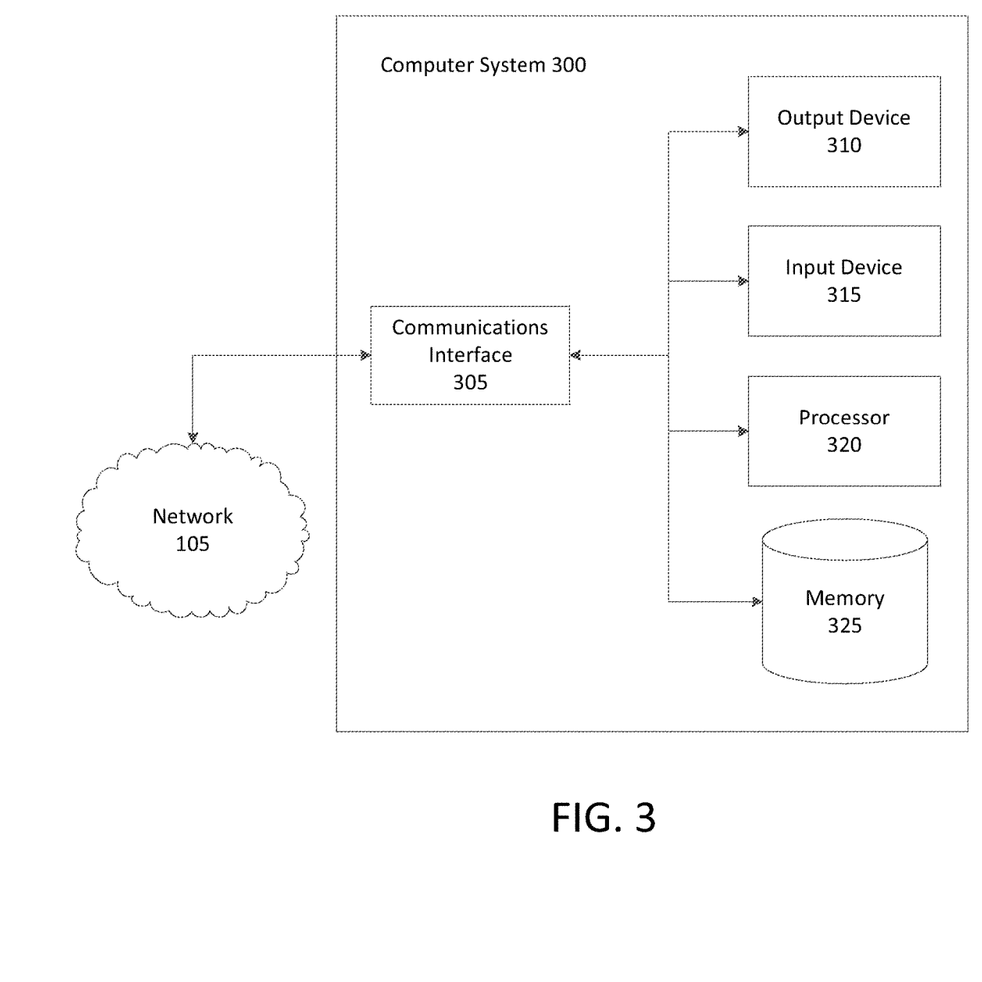
FIG. 3 is a block diagram illustrating a general architecture for a computer system that may be employed to implement various elements of the systems and methods described and illustrated herein, according to an illustrative implementation.

FIG. 3 shows the general architecture of an illustrative computer system 300 that may be employed to implement any of the computer systems discussed herein (including the system 100 and its components such as the content provider 115, the user device 120, the content publisher 125, source identification circuit 130, and the quality metric circuit 135 of system FIG. 1) in accordance with some implementations.

The computer system 300 can be used to determine or adjust a quality metric associated with the display of content from content provider 115 via the network 105. The computer system 300 of FIG. 3 comprises one or more processors 320 communicatively coupled to memory 325, one or more communications interfaces 305, and one or more output devices 310 (e.g., one or more display units) and one or more input devices 315. The processors 320 can be included in the content provider 115, the user device 120, the content publisher 125 or the other components of the system 100 such as the source identification circuit 130, and the quality metric circuit 135 of system FIG. 1.)

In the computer system 300 of FIG. 3, the memory 325 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the source identification circuit 130, and the quality metric circuit 135 can include the memory 325 to referring URL or the quality metric score. The processor(s) 320 shown in FIG. 3 may be used to execute instructions stored in the memory 325 and, in so doing, also may read from or write to the memory various information processed and or generated pursuant to execution of the instructions.

The processor 320 of the computer system 300 shown in FIG. 3 also may be communicatively coupled to or control the communications interface(s) 305 to transmit or receive various information pursuant to execution of instructions. For example, the communications interface(s) 305 may be coupled to a wired or wireless network, bus, or other communication means and may therefore allow the computer system 300 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 300. Examples of communications interfaces 305 include network interfaces connecting the various computing devices such as content provider 115, user device 120, and content publisher 125 to the network 105.

The output devices 310 of the computer system 300 shown in FIG. 3 may be provided, for example, to allow various information to be viewed or otherwise perceived in connection with execution of the instructions. The input device(s) 315 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content placement circuit 115 and the source allocation circuit 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 300 or system 100 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the source identification circuit 130 and the quality metric circuit 135 can be a single module, a logic device having one or more processing circuits, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of identifying user propensity to access content via a communication network, comprising:

receiving, at a data processing system, from a client device via the computer network, a request for content to provide for display with a destination web page via a Hypertext Transfer Protocol (HTTP);

identifying, by the data processing system, from a HTTP header field of the request, a referring URL that identifies a source web page, the source web page different from the destination web page and requested by the client device prior to requesting the destination web page;

determining, by the data processing system, an amount of time passed since the source web page was accessed by the client device based on browsing history of the client device;

determining, by the data processing system, a web site category of the source web page based on the referring URL identified from the HTTP header field of the request;

estimating, by the data processing system, a probability that the client device accesses content on one or more destination web pages after requesting the source web page based on the amount of time passed since the source web page was accessed by the client device and the web site category of the source web page;

assigning, by the data processing system, a score to the request based on the probability that the client device accesses the content on the one or more destination web pages after requesting the source web page;

adjusting, by the data processing system, a first quality metric for the client device based on the score, the first quality metric indicating a decreased likelihood, relative to a prior quality metric for the client device, of the client device to access a first content item provided for display with the destination web page; and transmitting, by the data processing system, responsive to adjusting the first quality metric, a second content item to the client device for display with the destination web page, the second content item different from the first content item and corresponding to a second quality metric greater than the first quality metric.

2. The method of claim 1, wherein the source web page is a search engine web page, further comprising:

adjusting the first quality metric to indicate an increased likelihood of the user to access the content provided for display with the destination web page.

3. The method of claim 1, wherein the source web page is a social network web page, further comprising:

adjusting the first quality metric to indicate the decreased likelihood of the user to access the content provided for display with the destination web page.

4. The method of claim 1, wherein the first quality metric is one of a click through rate and a conversion rate, and wherein the content provided for display with the web page includes an advertisement.

5. The method of claim 1, further comprising:
adjusting the first quality metric to generate an adjusted quality metric; and
adjusting a minimum bid value of an auction price to provide the content for display with the web page based on the adjusted quality metric.

6. A system for identifying user propensity to access content via a communication network, comprising:
a data processing circuit configured to:
receive, from a client device, a request for content to provide for display with a destination web page via a Hypertext Transfer Protocol (HTTP);
identify, from a HTTP header field of the request, a referring URL that identifies a source web page, the source web page different from the destination web page and requested by the client device prior to requesting the destination web page;
determines an amount of time passed since the source web page was accessed by the client device based on browsing history of the client device;
determines a web site type category of the source web page based on the referring URL identified from the HTTP header field of the request;
estimate a probability that the client device accesses content on one or more destination web pages after requesting the source web page based on the amount of time passed since the source web page was accessed by the client device and a web site category of the source web page;
assign a score to the request based on the probability that the client device accesses the content on the one or more destination web pages after requesting the source web page;
adjust a first quality metric for the client device based on the score, the first quality metric indicating a decreased likelihood, relative to a prior quality metric for the client device, of the client device a first content item provided for display with the destination web page; and
transmit, responsive to adjusting the first quality metric, a second content item, to the client device, for display with the destination web page, the second content item different from the first content item and corresponding to a second quality metric greater than the first quality metric.

7. The system of claim 6, wherein the source web page is a search engine web page, the data processing system further configured to:
adjust the first quality metric to indicate an increased likelihood of the user to access the content provided for display with the destination web page.

8. The system of claim 6, wherein the source web page is a social network web page, the data processing system further configured to:
adjust the first quality metric to indicate the decreased likelihood of the user to access the content provided for display with the destination web page.

9. The system of claim 6, wherein the first quality metric is one of a click through rate and a conversion rate, and wherein the content provided for display with the web page includes an advertisement.

10. The system of claim 6, wherein the data processing system further is configured to:
adjust the first quality metric to generate an adjusted quality metric; and
adjust a minimum bid value of an auction price to provide the content for display with the web page based on the adjusted quality metric.

11. A non-transitory computer readable medium having instructions to identify user propensity to access content via a communication network, the instructions comprising instructions to:
receive, from a client device, a request for content to provide for display with a destination web page via a Hypertext Transfer Protocol (HTTP);
identify, from a HTTP header field of the request, a referring URL that identifies a source web page, the source web page different from the destination web page, and requested by the client device prior to requesting the destination web page;
determine an amount of time passed since the source web page was accessed by the client device based on browsing history of the client device;
determines a web site category of the source web page based on the referring URL identified from the HTTP header field of the request;
estimate a probability that the client device accesses content on one or more destination web pages after requesting the source web page based on the amount of time passed since the source web page was accessed by the client device and a web site category of the source web page;
assign a score to the request based on the probability that the client device accesses the content on the one or more destination web pages after requesting the source web page;
adjust a first quality metric for the client device based on the score, a decreased likelihood, relative to a prior quality metric for the client device, of the client device a first content item provided for display with the destination web page; and
transmit, responsive to adjusting the first quality metric, a second content item, to the client device, for display with the destination web page, the second content item different from the first content item and corresponding to a second quality metric greater than the first quality metric.

12. The non-transitory computer readable medium of claim 11, wherein the source web page is a search engine web page, the instructions further comprising instructions to:
adjust the first quality metric to indicate an increased likelihood of the user to access the content provided for display with the destination web page.

13. The non-transitory computer readable medium of claim 11, wherein the source web page is a social network web page, the instructions further comprising instructions to:
adjust the first quality metric to indicate the decreased likelihood of the user to access the content provided for display with the destination web page.

14. The non-transitory computer readable medium of claim 11, wherein the first quality metric is one of a click through rate and a conversion rate, and wherein the content provided for display with the web page includes an advertisement.

15. The non-transitory computer readable medium of claim 11, the instructions further comprising instructions to:
adjust the first quality metric to generate an adjusted quality metric; and adjust a minimum bid value of an auction price to provide the content for display with the web page based on the adjusted quality metric.

\* \* \* \* \*